(12) United States Patent
Inoue et al.

(10) Patent No.: US 10,946,895 B2
(45) Date of Patent: Mar. 16, 2021

(54) CONTROL SYSTEM FOR VEHICLE

(71) Applicant: Mazda Motor Corporation, Hiroshima (JP)

(72) Inventors: Masao Inoue, Hiroshima (JP); Naoki Yamada, Hiroshima (JP); Yoshihisa Okamoto, Hiroshima (JP); Kazuhiro Takemura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/291,257

(22) Filed: Mar. 4, 2019

(65) Prior Publication Data

US 2019/0300051 A1  Oct. 3, 2019

(30) Foreign Application Priority Data

Mar. 29, 2018 (JP) ................................ 2018-064584

(51) Int. Cl.
  *B62D 6/00* (2006.01)
  *B62D 5/00* (2006.01)
  (Continued)

(52) U.S. Cl.
  CPC .............. *B62D 6/008* (2013.01); *B60T 7/042* (2013.01); *B60W 50/16* (2013.01); *B62D 5/006* (2013.01);
  (Continued)

(58) Field of Classification Search
  CPC ...... B62D 6/008; B62D 5/006; B62D 5/0463; B60T 7/042; B60W 50/16;
  (Continued)

(56) References Cited

U.S. PATENT DOCUMENTS

| 9,592,848 | B1 * | 3/2017 | Hirate | .................... B62D 6/008 |
| 2002/0125063 | A1 * | 9/2002 | Kurishige | ............ B62D 5/0466 |
| | | | | 180/443 |

(Continued)

FOREIGN PATENT DOCUMENTS

JP 2008296605 A 12/2008

OTHER PUBLICATIONS

Vladimir Chevatco, Exploration of Steering Feel, Degree Project in Vehicle Engineering, First Level (Stockholm, Sweden, 2015) (Year: 2015).*

*Primary Examiner* — Hunter B Lonsberry
*Assistant Examiner* — Daniel M. Robert
(74) *Attorney, Agent, or Firm* — Alleman Hall Creasman & Tuttle LLP

(57) ABSTRACT

A vehicle control system is provided, which includes a steering angle detector configured to detect a steering angle of a steering wheel by the operator, the steering wheel is mounted on the vehicle, a speed detector configured to detect a traveling speed of the vehicle, a reaction-force generator configured to generate a reaction force of the steering wheel, and a controller. The controller includes a processor configured to execute a lateral acceleration calculating module to calculate a lateral acceleration based on the traveling speed and the steering angle, a rigidity characteristic setting module to set the reaction force so that a rigidity value that is a ratio of the reaction force to the steering angle increases as the lateral acceleration increases, and a reaction-force control module to control the reaction-force generator so that the reaction force becomes the reaction-force value set by the rigidity characteristic setting module.

4 Claims, 10 Drawing Sheets

(51) Int. Cl.
  *B60T 7/04* (2006.01)
  *B60W 50/16* (2020.01)
  *B60K 26/02* (2006.01)
(52) U.S. Cl.
  CPC ...... *B60K 26/021* (2013.01); *B60K 2026/023* (2013.01)
(58) Field of Classification Search
  CPC ......... B60W 2520/10; B60W 2540/18; B60W 2540/10; B60W 2540/12; B60W 2710/202; B60W 2710/20; B60W 2556/50; B60W 10/20; B60W 10/06; B60W 10/30; B60W 30/045; B60K 26/021; B60K 2026/023; B60K 26/02
  See application file for complete search history.

(56) References Cited

U.S. PATENT DOCUMENTS

| | | | | |
|---|---|---|---|---|
| 2003/0052639 A1* | 3/2003 | Tanaka | ................ | B62D 5/0463 318/632 |
| 2006/0042860 A1* | 3/2006 | Endo | ................ | B62D 6/008 180/412 |
| 2008/0249685 A1* | 10/2008 | Hara | ................ | B62D 5/0466 701/42 |
| 2014/0041958 A1* | 2/2014 | Iijima | ................ | B62D 6/008 180/446 |
| 2017/0240205 A1* | 8/2017 | Nakada | ................ | B62D 6/003 |
| 2019/0054916 A1* | 2/2019 | Akiyama | ................ | B60W 10/04 |

* cited by examiner

CONTROL SYSTEM FOR VEHICLE

TECHNICAL FIELD

The present disclosure relates to a control system for a vehicle which controls a reaction force of a steering wheel of the vehicle.

BACKGROUND OF THE DISCLOSURE

Conventionally, vehicles provided with by-wire mechanisms using x-by-wire technologies are known. Some by-wire mechanisms are provided with an operation mechanism which is operated by an operator, a reaction-force generating mechanism which generates on the operation mechanism a reaction force to be given to the operator, and a driving mechanism which drives the vehicle so that the vehicle is operated by a given response amount according to the operating amount of the operation mechanism operated by the operator. In such a by-wire mechanism, the mechanical coupling between the operation mechanism (and the reaction-force generating mechanism) and the driving mechanism is replaced by an electrical coupling using electrical signals. The operation mechanism and the driving mechanism are controlled independently so that the operation of the operation mechanism by the operator, the reaction force to the operator, and the response of the vehicle are mechanically separated from each other.

Steer-by-wire technology among various by-wire mechanisms uses a steering angle of a steering wheel operated by the operator as a parameter to control a reaction force to the operator's operation through the steering wheel, and behavior (lateral acceleration) of the vehicle. Generally, the reaction force generated in the steering wheel is set according to a characteristic proportional to a steering angle to improve an operation stability of the steering wheel.

JP2008-296605A discloses an operational reaction force control device for vehicles which sets a dynamic characteristic of the entire system including an operator and an operation mechanism, defines a given evaluation index value, defines a value of a human system dynamic characteristic of the operator, inputs the defined operator's dynamic characteristic value into the entire system dynamic characteristic, defines a value of the mechanical system dynamic characteristic in the entire dynamic characteristic so as to acquire the defined evaluation index value, and controls a reaction force to the operation of the operation mechanism based on the defined mechanical system dynamic characteristic value. Therefore, a reaction force to the operation in consideration of the dynamic characteristic of human's arms and legs is acquired to reduce an operator's burden.

In order for the operator to obtain satisfaction and a sense of fulfillment while operating the vehicle (operating the operation mechanism), it is indispensable that the operator can operate the vehicle as he/she intended. Achievement of "operation as the operator intended" is that the operator is able to perform an intuitive operation based on a response accompanying his/her operation of the operation mechanism. In other words, it can also be defined as a traveling control which is desired by the operator being able to be performed based on the intuitive operation against the response. By the technology of JP2008-296605A, the operator's burden accompanying the steering operation is reduced by taking inertia, viscosity, and rigidity which are impedances of the human system into consideration. However, in terms of achievement of the "operation as the operator intended," this technology does not take a lateral acceleration of the vehicle during turning into consideration. Therefore, the fact may give the operator discomfort because the operating sensation which the operator actually recognizes through the operation of the steering wheel does not match with the actual vehicle behavior.

That is, since priority is given to the reduction of the burden based on the impedance of the human system, a traveling situation may arise in which the reaction force to the operation when the lateral acceleration is minor becomes greater than the reaction force to the operation when the lateral acceleration is great. Therefore, the physical sensation of the operator through the steering wheel does not match with the actual vehicle behavior. That is, in order to enable the traveling control matched with the operator's intuitive operating sensation, there is still room for further improvement.

SUMMARY OF THE DISCLOSURE

One purpose of the present disclosure is to provide a control system for a vehicle, which enables a steering control matched with an operator's intuitive operating sensation.

According to one aspect of the present disclosure, a control system for a vehicle is provided, which includes a steering angle detector configured to detect a steering angle of a steering wheel by an operator, the steering wheel mounted on the vehicle, a speed detector configured to detect a traveling speed of the vehicle, a reaction-force generator configured to generate a reaction force of the steering wheel, and a controller electrically connected with the steering angle detector, the speed detector and the reaction-force generator. The controller includes processor configured to execute a lateral acceleration calculating module to calculate a lateral acceleration based on the traveling speed and the steering angle, a rigidity characteristic setting module to set the reaction force so that a rigidity value that is a ratio of the reaction force to the steering angle increases as the lateral acceleration calculated by the lateral acceleration calculating module increases, and a reaction-force control module to control the reaction-force generator so that the reaction force generated by the reaction-force generator becomes the reaction-force value set by the rigidity characteristic setting module.

According to this structure, since the control system has the steering angle detector which detects the steering angle of the steering wheel by the operator, the speed detector which detects the traveling speed of the vehicle, and the lateral acceleration calculating module which calculates the lateral acceleration of the vehicle based on the detected steering angle and traveling speed, the lateral acceleration which is the vehicle behavior resulting from the steering angle of the steering wheel by the operator can be calculated. Since the control system has the reaction-force controlling module which can control the reaction force given to the operator through the steering wheel, a suitable operating sensation of the steering wheel can be sensed by the operator. Further, since the reaction-force control module controls the reaction force so that the rigidity value which is the ratio of the reaction force of the steering wheel to the steering angle increases as the calculated lateral acceleration increases, the operating sensation of the steering wheel can be directly associated with the lateral acceleration of the vehicle, thereby matching the physical sensation (load tendency) of the operator through the steering wheel with the actual vehicle behavior (acceleration tendency of operation).

Therefore, the steering control of the vehicle with the operator's intuitive operating sensation is possible.

The control system may further include memory configured to store a rigidity characteristic map defining a rigidity characteristic comprised of the lateral acceleration and the rigidity value, the rigidity characteristic having a first changing point at a position on the map near the lateral acceleration that can be sensed by the operator, and the rigidity characteristic being set so that the rigidity increasing rate when the lateral acceleration is greater than that of the first changing point is greater than the rigidity increasing rate when the lateral acceleration is less than that of the first changing point.

According to this structure, the operator's operating sensation can be divided into a non-accelerating range (a play range and a constant-speed range) and an acceleration range. Moreover, the operator can intuitively recognize the reference point when turning the operation mechanism back to the neutral position.

The rigidity characteristic may have a second changing point at which the lateral acceleration is greater than the first changing point, and the rigidity characteristic being set so that the rigidity increasing rate when the lateral acceleration is greater than that of the second changing point is less than the rigidity increasing rate when the lateral acceleration is less than that of the second changing point.

According to this structure, the operability in a high acceleration range is secured, while the operator's operating sensation is divided into the acceleration range and a high acceleration range.

The reaction-force generator may include an electric motor configured to generate the reaction force according to the steering angle of the steering wheel.

According to this structure, the physical sensation of the operator through the steering wheel can be matched with the actual vehicle behavior with a simple configuration.

DETAILED DESCRIPTION OF THE DISCLOSURE

Hereinafter, one embodiment of the present disclosure is described in detail with reference to the accompanying drawings. The following description illustrates a control system for a vehicle provided with a steer-by-wire mechanism, an accelerator-by-wire or throttle-by-wire mechanism, and a brake-by-wire mechanism, to which the present disclosure is applied, but it is not to limit the present disclosure, its applications, and its usage.

Figure 1:
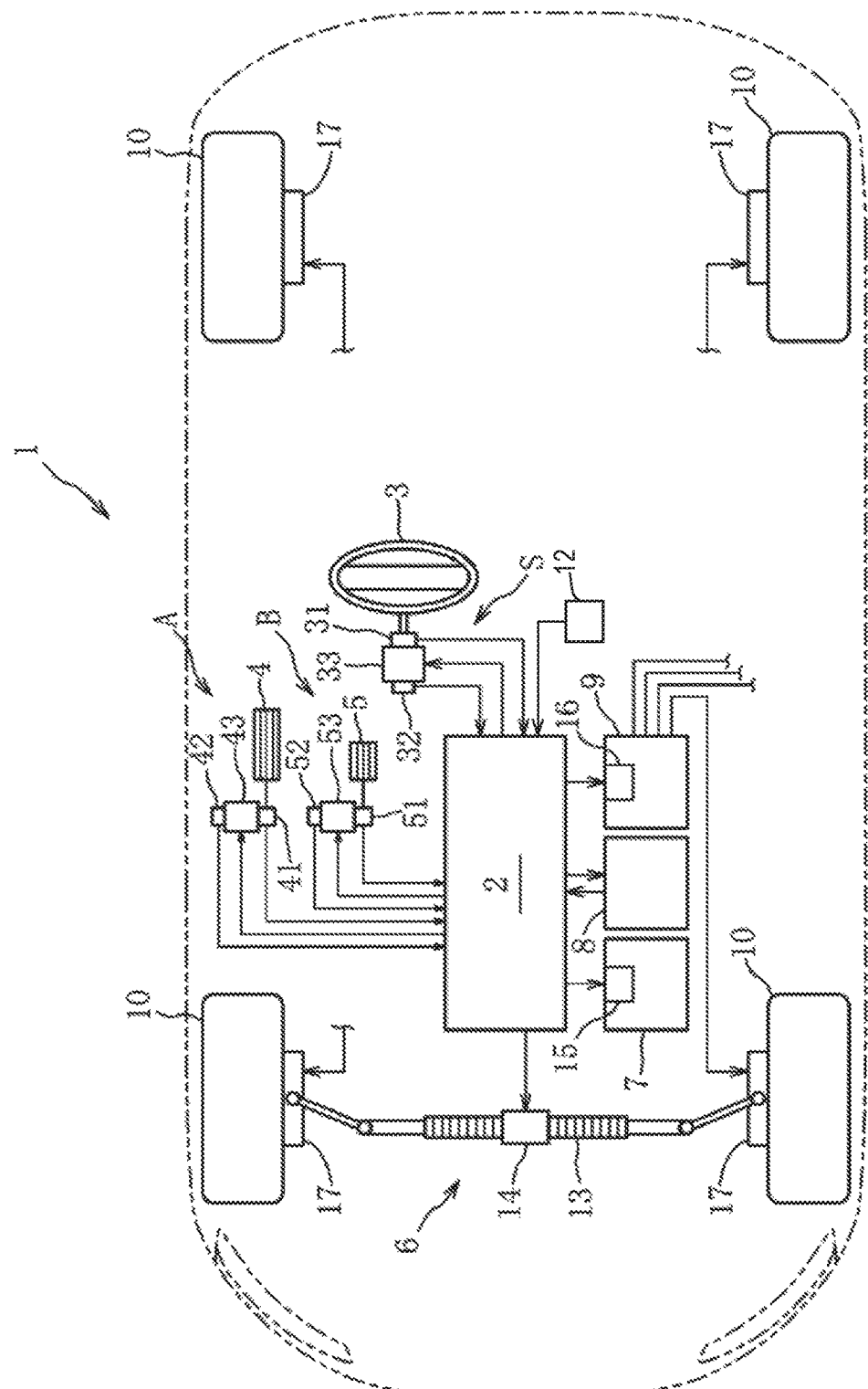
FIG. 1 is a view schematically illustrating the entire configuration of a control system for a vehicle according to one embodiment.

Below, one embodiment of the present disclosure is described based on FIGS. 1 to 10. As illustrated in FIG. 1, a vehicle of this embodiment has a control system 1 for vehicles. This control system 1 mainly includes a steer-by-wire mechanism S, an accelerator-by-wire mechanism A, a brake-by-wire mechanism B, and an ECU (Electronic Control Unit) 2, also referred to as a controller. The vehicle also includes a steering wheel 3 as an arm operating mechanism, an accelerator pedal 4 and a brake pedal 5 as leg operating mechanisms, a steering device 6, an engine 7, a transmission 8, a brake device 9, and two pairs of wheels 10.

The transmission 8 is, for example, an automatic transmission, and transmits an engine torque outputted from the engine 7 to a front-wheel differential gear mechanism (not illustrated) at a selected gear position. The transmission 8 is provided with a position sensor 11 (see FIG. 2) which detects a currently-selected gear position. The vehicle is also provided with a speed sensor 12 (see FIG. 2) which detects a traveling speed of the vehicle, as one example of a speed detector. Detection signals from the position sensor 11 and the speed sensor 12 are outputted to the ECU 2 as needed.

Figure 2:
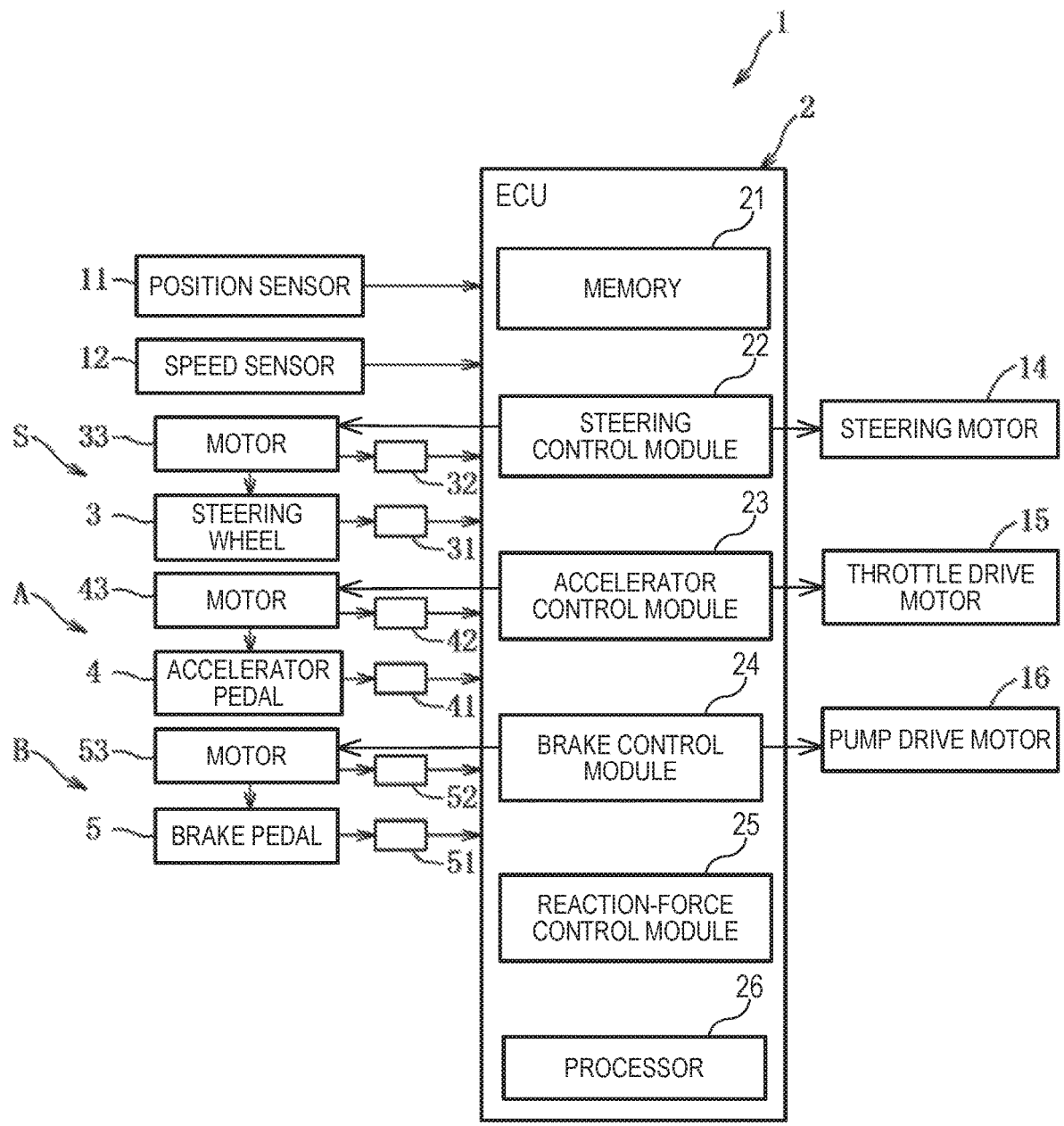
FIG. 2 is a block diagram illustrating the control system.

First, the steer-by-wire mechanism S is described. As illustrated in FIGS. 1 and 2, the steer-by-wire mechanism S is comprised of the steering wheel 3, and the steering device 6 which is a steer driving mechanism of a pair of left and right front wheels 10, which are mechanically separated from each other. The steer-by-wire mechanism S also includes a steering sensor 31 which detects an operating amount of the steering wheel 3 by the operator (e.g., a steering angle), as one example of a steering angle detector, a torque sensor 32 which detects an operating force (e.g., a steering torque) accompanying the operation of the steering wheel 3, and an electric motor 33 which gives a physical reaction force to the steering wheel 3 based on the operating amount of the steering wheel 3, as one example of a reaction-force generator.

The steering device 6 includes a steering rod 13 with a rack gear coupled to the front driving wheels 10 through linkages, and a steering motor 14 provided with a pinion gear which drives the steering rod 13 in the left-and-right directions. The steering motor 14 drives the steering rod 13 to steer the front wheels 10 so that a slip angle of the wheels 10 which is a physical response amount of the vehicle is controlled. The steering motor 14, the steering sensor 31, the torque sensor 32, and the motor 33 are electrically connected with the ECU 2.

Next, the accelerator-by-wire mechanism A is described. As illustrated in FIGS. 1 and 2, the accelerator-by-wire mechanism A is comprised of the accelerator pedal 4 having an organ-type pedal support structure where a heel of the operator is supported by a cabin floor panel during a pedal operation, and a throttle valve (not illustrated) of the engine 7, which are mechanically separated from each other. The accelerator-by-wire mechanism A also includes an accelerator sensor 41 which detects an operating amount of the accelerator pedal 4 by the operator (e.g., a rotation angle on a rotation axis corresponding to a stepping stroke of the pedal), and a torque sensor 42 which detects an operating force (e.g., a stepping force) accompanying the operation of the accelerator pedal 4, and an electric motor 43 which gives a physical reaction force to the accelerator pedal 4 based on the operating amount of the accelerator pedal 4.

The engine 7 has a throttle drive motor 15 which drives a throttle valve to rotate. The throttle drive motor 15 adjusts a valve opening of the throttle valve to control an acceleration which is a physical response amount of the vehicle. The throttle drive motor 15, the accelerator sensor 41, the torque sensor 42, and the motor 43 are electrically connected with the ECU 2.

Next, the brake-by-wire mechanism B is described. As illustrated in FIGS. 1 and 2, the brake-by-wire mechanism B is comprised of the brake pedal 5 having a suspended pedal support structure in which the heel of the operator is not supported by the floor panel during a pedal operation, and a hydraulic brake mechanism 17 which brakes the wheels 10, which are mechanically separated from each other. The brake-by-wire mechanism B also includes a brake sensor 51 which detects an operating amount of the brake pedal 5 by the operator (stepping stroke), a torque sensor 52 which detects an operating force (stepping force) accompanying the operation of the brake pedal 5, and an electric motor 53 which gives a physical reaction force to the brake pedal 5 based on the operating amount of the brake pedal 5.

The hydraulic brake mechanism 17 includes rotor disks each provided to the wheel 10 so as to be integrally rotatable with the wheel 10, and calipers which can give a braking force to the rotor disks (none are illustrated). The brake device 9 includes a hydraulic pump having a pump drive motor 16 as a driving source, a pressurizing valve, and a return valve (none are illustrated). The hydraulic pump is connected with the cylinders disposed at the calipers. When a brake fluid pressure is supplied to the cylinders from the hydraulic pump, pistons press brake pads against the rotor disks to control a deceleration which is a physical response amount of the vehicle. The pump drive motor 16, the brake sensor 51, the torque sensor 52, and the electric motor 53 are electrically connected with the ECU 2.

Next, the ECU 2 is described. The ECU 2 is comprised of a processor 26 (e.g., a CPU (Central Processing Unit)), memory 21 comprising ROM and RAM, an IN-side interface, and an OUT-side interface. The ROM stores various programs and data for carrying out a collaborative control, and the RAM is provided with a processing area used by the processor 26 executing a series of processings. When the operator operates at least any one of the steering wheel 3, the accelerator pedal 4, and the brake pedal 5 which are the operation mechanisms, the ECU 2 transmits to the corresponding motors 14-16 operating instruction signal(s) for causing the vehicle to demonstrate the behavior according to the operating amount (e.g., a response amount). Synchronizedly with the transmission of the operating instruction signals related to the vehicle behavior, the ECU 2 transmits to the corresponding motors 33, 43, and 53 operating instruction signals for generating the reaction forces according to the vehicle behavior.

As illustrated in FIG. 2, the ECU 2 has the memory 21 in which a steering control module 22, an accelerator control module 23, a brake control module 24, and a reaction-force control module 25 are stored as software. The processor 26 is configured to execute these modules to perform their respective functions. The steering control module 22 is an example of a lateral acceleration calculating module and a the rigidity characteristic setting module.

The memory 21 stores, in order to control the behavior of the vehicle, i.e., accelerations of movements, a plurality of lateral acceleration characteristic maps which define a relation between a slip angle of the front wheels 10 and a lateral acceleration, a plurality of acceleration characteristic maps which define a relation between the operating amount of the accelerator pedal 4 (rotation angle) and the acceleration (including the "predicted acceleration"), for every speed and gear position, and a deceleration characteristic map which defines a relation between the operating amount of the brake pedal 5 (stepping stroke) and a deceleration (none are illustrated). The memory 21 also stores, in order to control the reaction force to be given to the operator i.e., an operating load, a steering rigidity characteristic map M1, an accelerator rigidity characteristic map M2, and a brake rigidity characteristic map M3. Note that the term "lateral acceleration" as used herein refers to, without being limited to the lateral acceleration (actually-measured lateral acceleration) calculated only based on the steering angle and the traveling speed, an acceleration based on the steering angle and the traveling speed in consideration of the vehicle control for stabilizing the vehicle behavior (i.e., a "predicted lateral acceleration" which also considers the vehicle control). A calculation of the "predicted lateral acceleration" will be described later.

Figure 3:
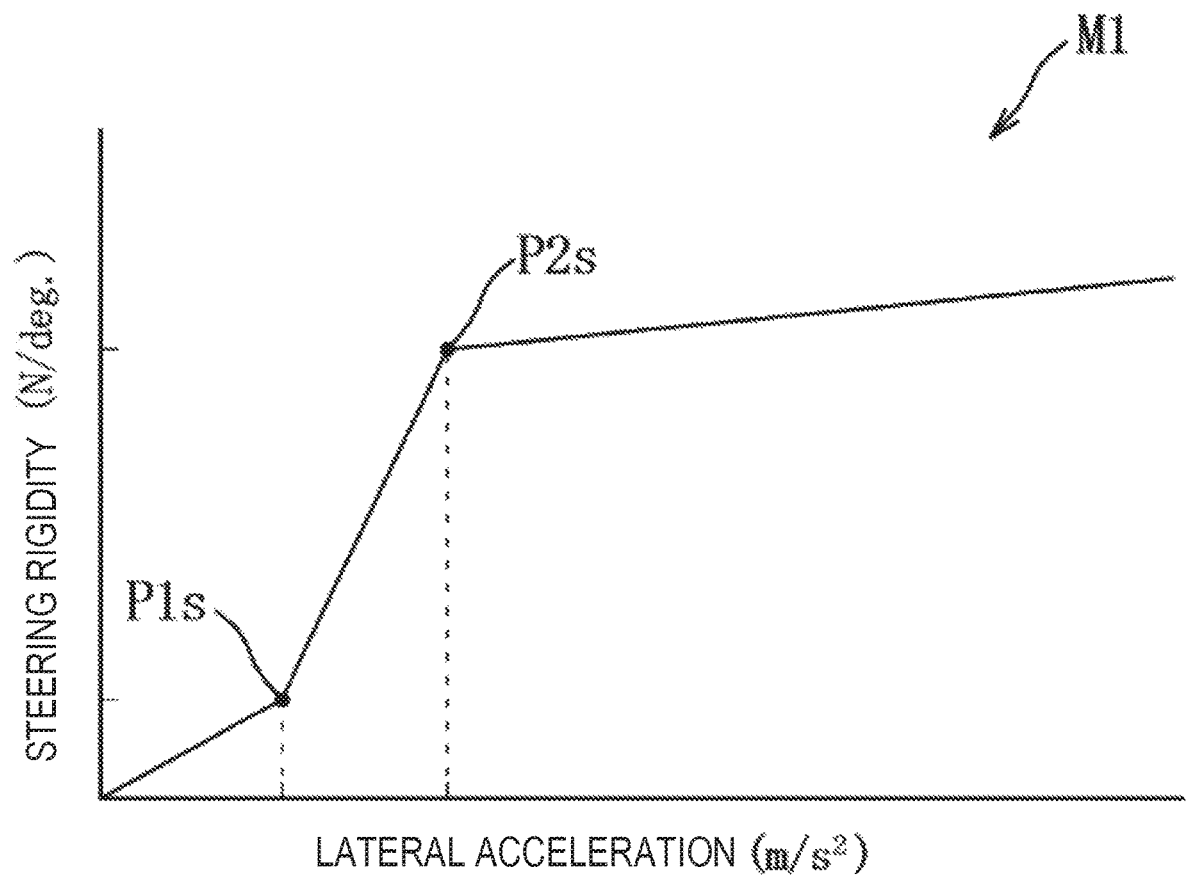
FIG. 3 is a steering rigidity characteristic map.

As illustrated in FIG. 3, the steering rigidity characteristic map M1 is set so that a steering rigidity increases as the lateral acceleration increases, where the lateral axis indicates the lateral acceleration (m/s') and the vertical axis indicates the steering rigidity (N/deg). The steering rigidity can be obtained by dividing the reaction force of the steering wheel 3 by the operating amount of the steering wheel 3 (steering angle). In the steering rigidity characteristic map M1, a first changing point P1$s$ is set to divide a non-accelerating range (a play range and a constant-speed range) and a first acceleration range, and a second changing point P2$s$ is set to divide the first acceleration range and a second acceleration range.

Figure 4:
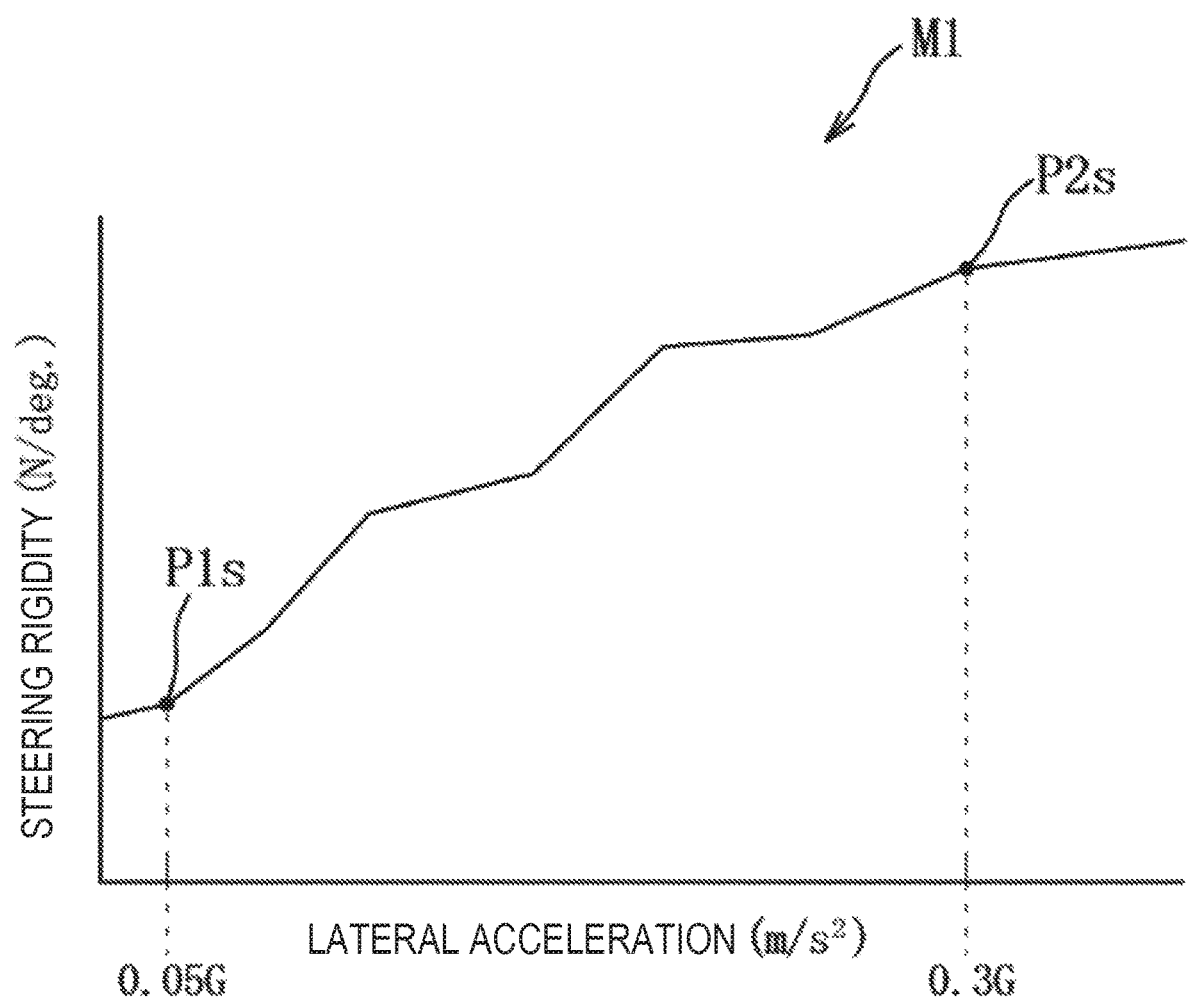
FIG. 4 is a graph illustrating the steering rigidity characteristic.

As illustrated in FIG. 4, the first changing point P1$s$ is set to a lateral acceleration of the vehicle which can be sensed by the operator (e.g., 0.05 G), and the second changing point P2$s$ is set to a lateral acceleration at which the operator senses the operation of the steering wheel 3 as a burden in terms of workload under a given condition (e.g., 0.30 G). The given condition is a steering range of 60 degrees to the left and 60 degrees to the right from the neutral position of the steering wheel 3, while the operator does not switch his/her hand on the steering wheel 3 from one to another. Thus, when this given condition is satisfied, the steering rigidity characteristic map M1 is used. Assuming that a rigidity increasing rate in the non-accelerating range is Ks0, a rigidity increasing rate in the first acceleration range is Ks1, and a rigidity increasing rate in the second acceleration range is Ks2, a relation of the following formula (1) can be established.

$$0 \leq Ks2 < Ks0 < Ks1 \tag{1}$$

Figure 5:
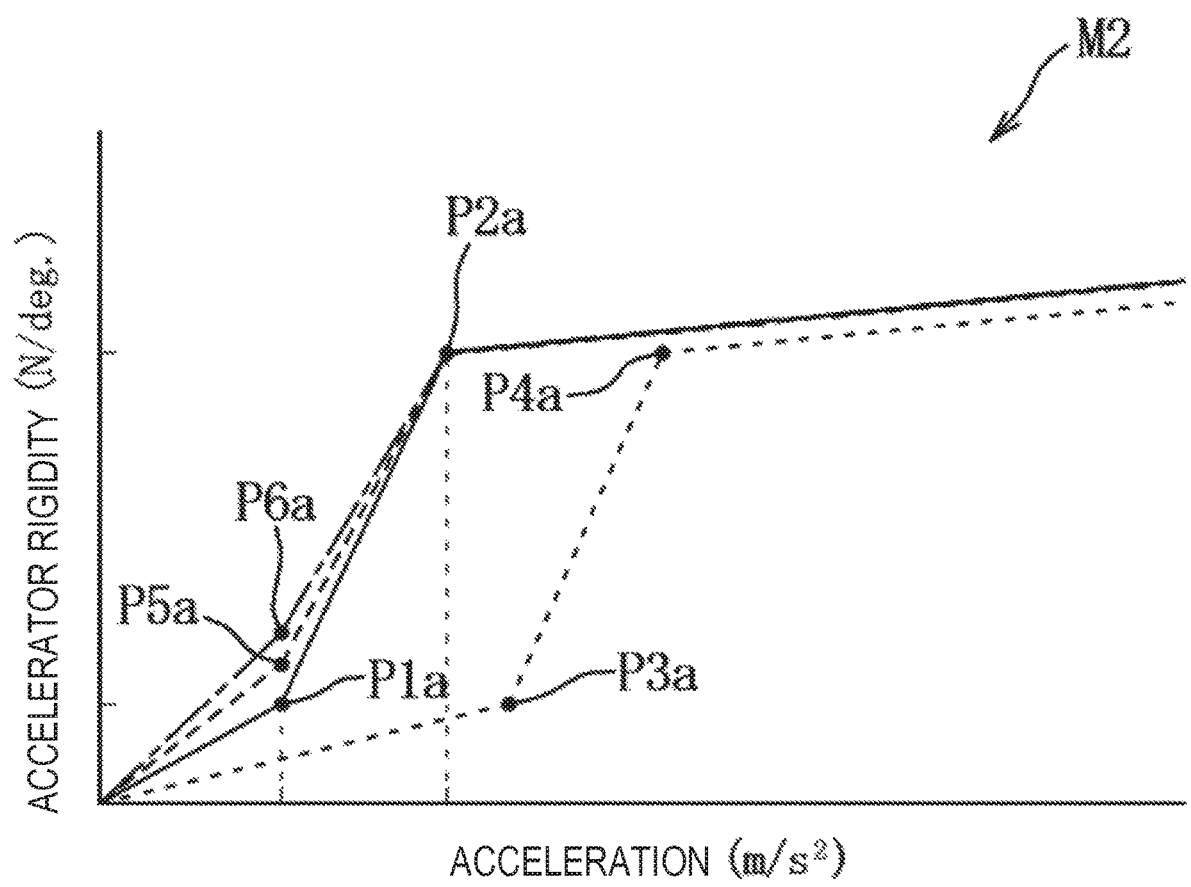
FIG. 5 is an accelerator rigidity characteristic map.

As illustrated in FIG. 5, the accelerator rigidity characteristic map M2 is set so that the acceleration increases as an accelerator rigidity increases, where the lateral axis indicates the acceleration (m/s$^2$) and the vertical axis indicates the accelerator rigidity (N/deg). The accelerator rigidity can be obtained by dividing the reaction force of the accelerator pedal 4 by the operating amount of the accelerator pedal 4 (rotation angle). In the accelerator rigidity characteristic map M2, a first changing point P1$a$ (also P5$a$, P6$a$) is set to divide a non-accelerating range (a play range and a constant-speed range) and a first acceleration range, and a second changing point P2$a$ is set to divide the first acceleration range and a second acceleration range.

Figure 6:
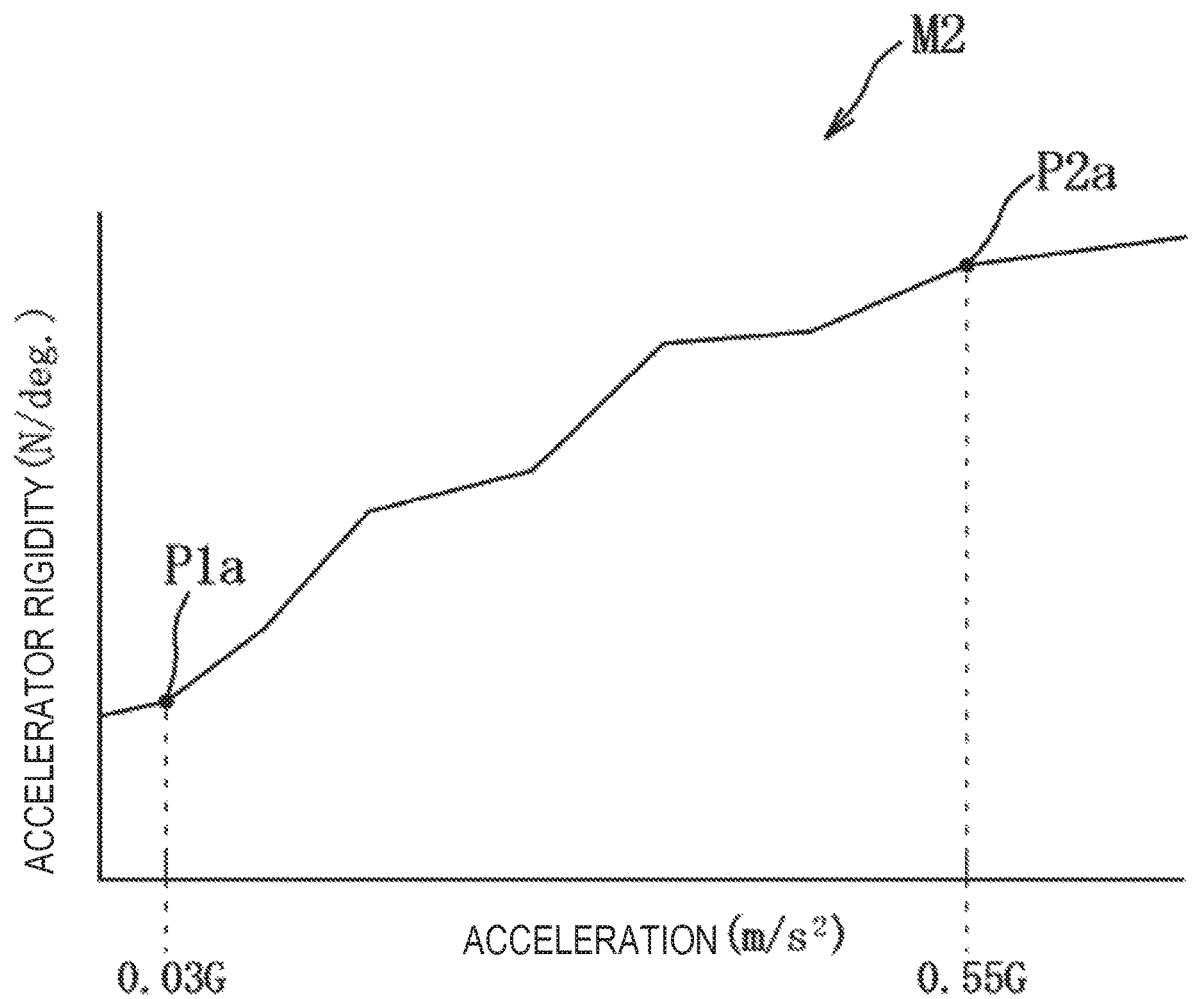
FIG. 6 is a graph illustrating the accelerator rigidity characteristic.

As illustrated in FIG. 6, the first changing point P1$a$ is set to an acceleration of the vehicle which can be sensed by the operator (e.g., 0.03 G), and the second changing point P2$a$ is set to an acceleration at which the operator senses the operation of the accelerator pedal 4 as a burden in terms of workload (e.g., 0.55 G). Assuming that a rigidity increasing rate in the non-accelerating range is Ks0, a rigidity increasing rate in the first acceleration range is Ka1, and a rigidity increasing rate in the second acceleration range is Ka2, a relation of the following formula (2) can be established.

$$0 \leq Ka2 < Ka0 < Ka1 \quad (2)$$

As illustrated in FIG. 5, in the accelerator rigidity characteristic map M2, the rigidity characteristic is changed corresponding to the currently-selected gear position. A first changing point P3a of the rigidity characteristic (dotted line) at the 1st gear has the same accelerator rigidity value as the first changing point P1a of the rigidity characteristic (solid line) at the 2nd gear, but has a greater acceleration than the first changing point P1a. This is to secure an initial power for driving a stopped vehicle. A second changing point P4a of the rigidity characteristic (dotted line) at the 1st gear has the same accelerator rigidity value as the second changing point P2a of the rigidity characteristic (solid line) at the 2nd gear, but has a greater acceleration than the second changing point P2a. This is to make a rigidity increasing rate in the first acceleration range at the 1st gear substantially the same as the rigidity increasing rate Ka1 in the first acceleration range at the 2nd gear. Note that the rigidity increasing rates in the second acceleration range are substantially the same.

The first changing point P5a of the rigidity characteristic (dashed line) at the 3rd gear has the same acceleration value as the first changing point P1a of the rigidity characteristic (solid line) at the 2nd gear, but has a higher accelerator rigidity than the first changing point P1a. The first changing point P6a of the rigidity characteristic (one-point chain line) at the 6th gear has the same acceleration value as the first changing point P5a of the rigidity characteristic (dashed line) at the 3rd gear, but has a higher accelerator rigidity than the first changing point P5a. That is, at the first changing point of the rigidity characteristic at the 2nd and higher gear positions, the acceleration is the same, but the accelerator rigidity increases as the gear position becomes higher. Note that the second changing points of the rigidity characteristic at the 2nd and higher gear positions do not change (i.e., are constant), regardless of a gear position. Note that illustration of the rigidity characteristics of the 4th gear and the 5th gear are omitted.

Normally, the gear is changed when the vehicle becomes in a constant-speed state after the accelerator pedal 4 is released. In this embodiment, since the first changing point is set for dividing the non-accelerating range and the first acceleration range, and the rigidity increasing rate in the non-accelerating range is set smaller than the rigidity increasing rate in the first acceleration range, the operator can sense the constant-speed state intuitively based on the sensation when he/she steps on the accelerator pedal 4 to judge a timing of a gear shift.

Figure 7:
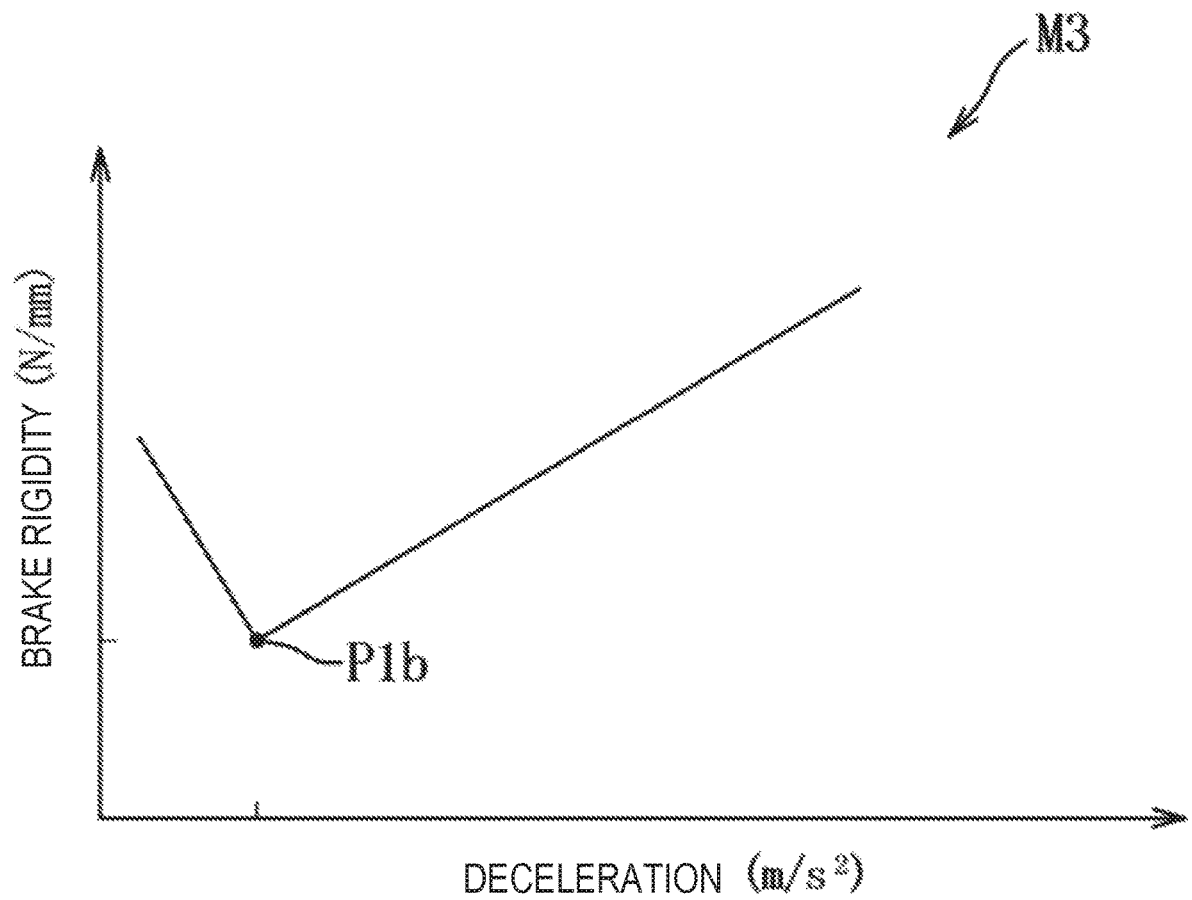
FIG. 7 is a brake rigidity characteristic map.

As illustrated in FIG. 7, in the brake rigidity characteristic map M3, the lateral axis indicates a deceleration (m/s²) and the vertical axis indicates a brake rigidity (N/mm). The brake rigidity can be obtained by dividing the reaction force of the brake pedal 5 by the operating amount of the brake pedal 5 (stepping stroke). In the brake rigidity characteristic map M3, a first changing point P1b is set to divide a non-decelerating range (a play range and a constant-speed range) and a decelerating range.

Note that a brake control is opposite in the operating direction of the vehicle from the accelerator control described previously. However, since the vehicle behavior (acceleration of the vehicle) increases as the deceleration increases, the deceleration can be considered to be a negative acceleration. Thus, in this embodiment, the deceleration is treated as one of the accelerations like the lateral acceleration and the acceleration. The following description will be made under a condition that the acceleration increases as the deceleration increases.

The first changing point P1b is set to a deceleration of the vehicle which can be sensed by the operator. Assuming that a rigidity increasing rate in the non-decelerating range is Kb0 and, when the rigidity increasing rate in the decelerating range is Kb 1, a relation of the following formula (3) can be established.

$$Kb0 < 0 < Kb1 \quad (3)$$

Since the brake pedal 5 has the suspended pedal support structure, the weight of the operator's leg acts on the brake pedal 5 even before a pedal operation. Thus, the rigidity increasing rate Kb0 is set as a negative value in order to secure the suitable play range and the constant-speed range in consideration of the weight of the leg.

Next, the steering control module 22, the accelerator control module 23, the brake control module 24, and the reaction-force control module 25 are described. The steering control module 22 selects one of the plurality of lateral acceleration characteristic maps based on the traveling speed of the vehicle, and calculates the lateral acceleration based on the selected lateral acceleration characteristic map, and the slip angle of the front wheels 10 calculated based on the steering angle of the steering wheel 3. A target steering angle is calculated based on the lateral acceleration, and an operating instruction signal to be transmitted to the steering motor 14 is created. Moreover, the steering control module 22 calculates the steering rigidity based on the calculated lateral acceleration and the steering rigidity characteristic map M1, and transmits to the motor 33 the operating instruction signal corresponding to the steering rigidity.

The accelerator control module 23 selects one of the plurality of acceleration characteristic maps based on the traveling speed of the vehicle and the gear position, and calculates the acceleration based on the selected acceleration characteristic map and the operating amount of the accelerator pedal 4 (rotation angle). A target torque is calculated based on the acceleration, and an operating instruction signal to be transmitted to the throttle drive motor 15 is created. Moreover, the accelerator control module 23 calculates the accelerator rigidity based on the calculated acceleration and the accelerator rigidity characteristic map M2, and transmits to the motor 43 the operating instruction signal corresponding to the accelerator rigidity.

The brake control module 24 calculates the deceleration based on the operating amount of the brake pedal 5 (stepping stroke) and the deceleration characteristic map. A target braking pressure is calculated based on the deceleration, and an operating instruction signal to be transmitted to the pump drive motor 16 is created. Moreover, the brake control module 24 calculates the brake rigidity based on the calculated deceleration and the brake rigidity characteristic map M3, and transmits to the motor 53 the operating instruction signal corresponding to the brake rigidity.

The reaction-force control module 25 controls the motors 33, 43, and 53 so that the reaction force to generated by the motors 33, 43, and 53 becomes a reaction-force value set by the steering control module 22, the accelerator control module 23, and the brake control module 24.

Figure 8:
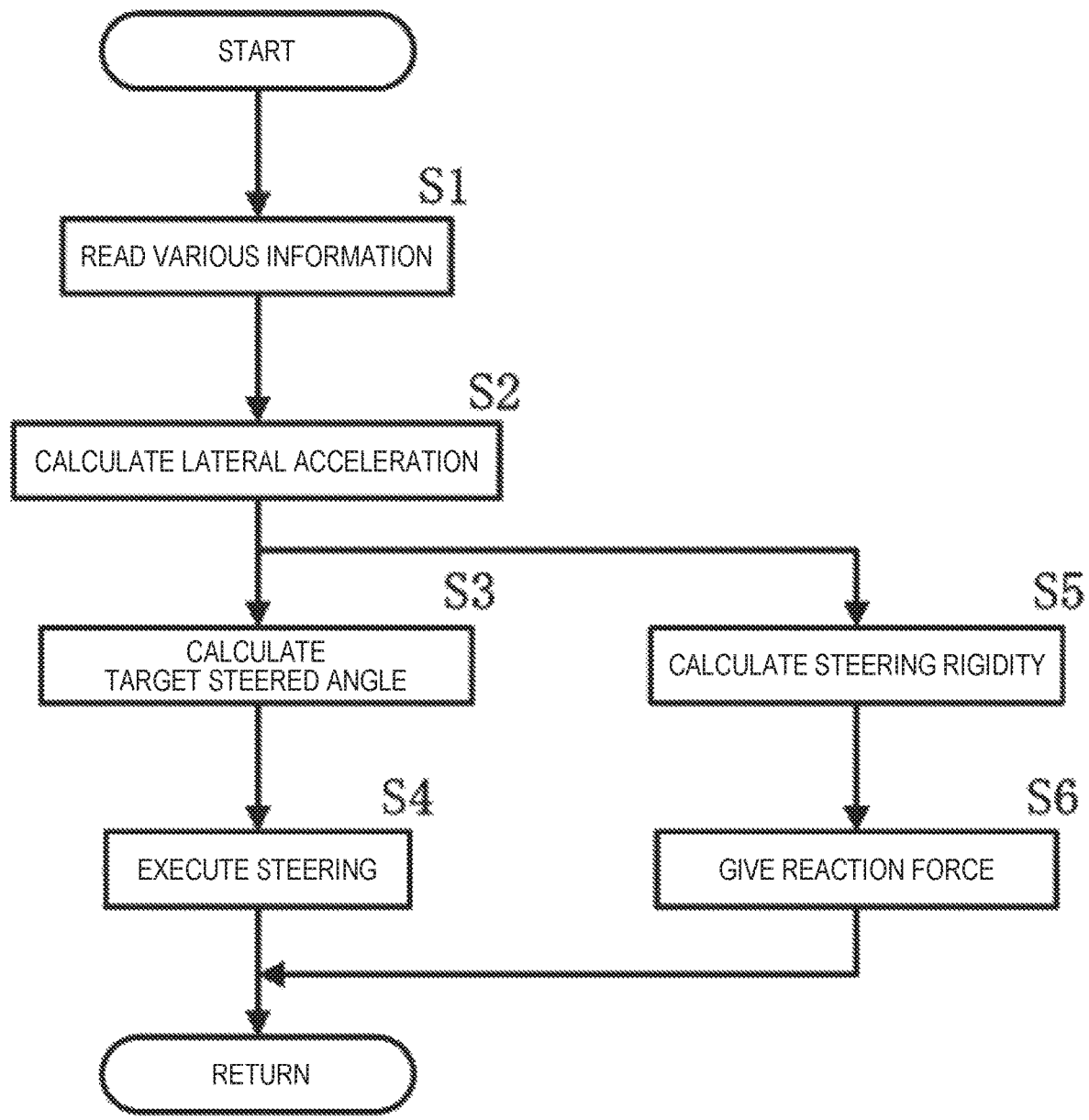
FIG. 8 is a flowchart illustrating a steering control.

Next, a steering control is described based on a flowchart of FIG. 8. Here, Si (i=1, 2, . . . ) indicates a step of each processing. First, at S1, the steering control module 22 reads a variety of information, such as the steering angle of the steering wheel 3, the lateral acceleration characteristic map, and the steering rigidity characteristic map M1, and then shifts to S2. At S2, the steering control module 22 calculates the lateral acceleration based on the lateral acceleration characteristic map, etc., and then shifts to S3 and S5.

At S3, the steering control module 22 calculates a target steering angle based on the lateral acceleration, and then shifts to S4. At S4, the steering control module 22 controls the steering motor 14 to steer the wheels 10 to the target steered angle, and then returns to S1. After S2, the steering control module 22 calculates, synchronizedly with S3, a target steering rigidity based on the lateral acceleration and the steering rigidity characteristic map M1 (S5), and then shifts to S6. At S6, the steering control module 22 controls the motor 33 so that the steering wheel 3 has the steering rigidity according to the lateral acceleration, and then returns to S1.

Figure 9:
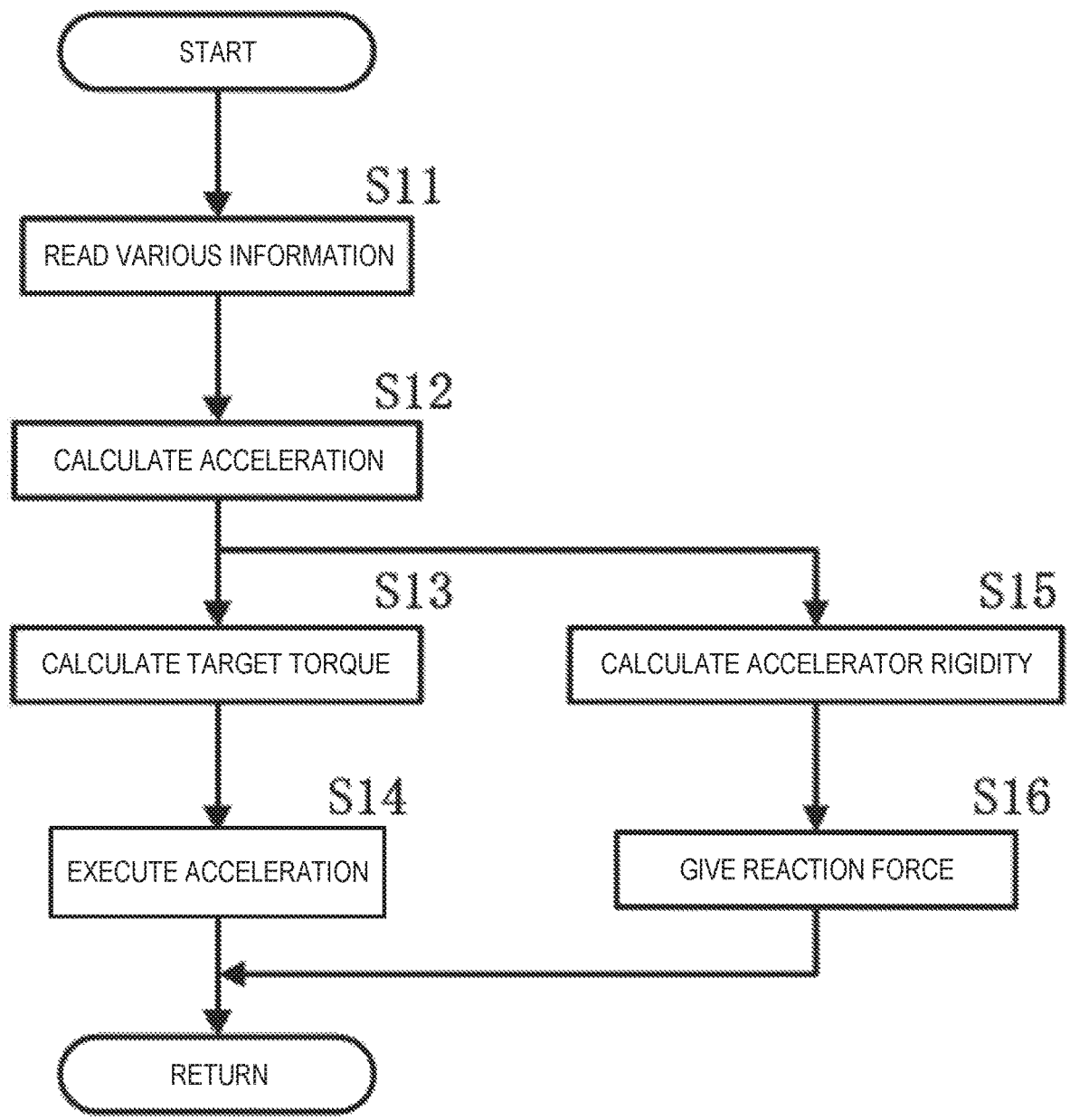
FIG. 9 is a flowchart illustrating an accelerator control.

Next, an accelerator control is described based on a flowchart of FIG. 9. Note that the accelerator control is executed in parallel with the steering control illustrated in FIG. 8. First, at S11, the accelerator control module 23 reads a variety of information, such as the rotation angle of the accelerator pedal 4, the acceleration characteristic map, and the accelerator rigidity characteristic map M2, and then shifts to S12. At S12, the accelerator control module 23 calculates the acceleration based on the acceleration characteristic map, etc., and then shifts to S13 and S15.

At S13, the accelerator control module 23 calculates a target torque based on the acceleration, and then shifts to S14. At S14, the accelerator control module 23 controls the throttle drive motor 15 so that the output of the engine 7 reaches the target torque, and then returns to S11. After S12, the accelerator control module 23 calculates, synchronizedly with S13, a target accelerator rigidity based on the acceleration and the accelerator rigidity characteristic map M2 (S15), and then shifts to S16. At S16, the accelerator control module 23 controls the motor 43 so that the accelerator pedal 4 has the accelerator rigidity corresponding to the acceleration, and then returns to S11.

Figure 10:
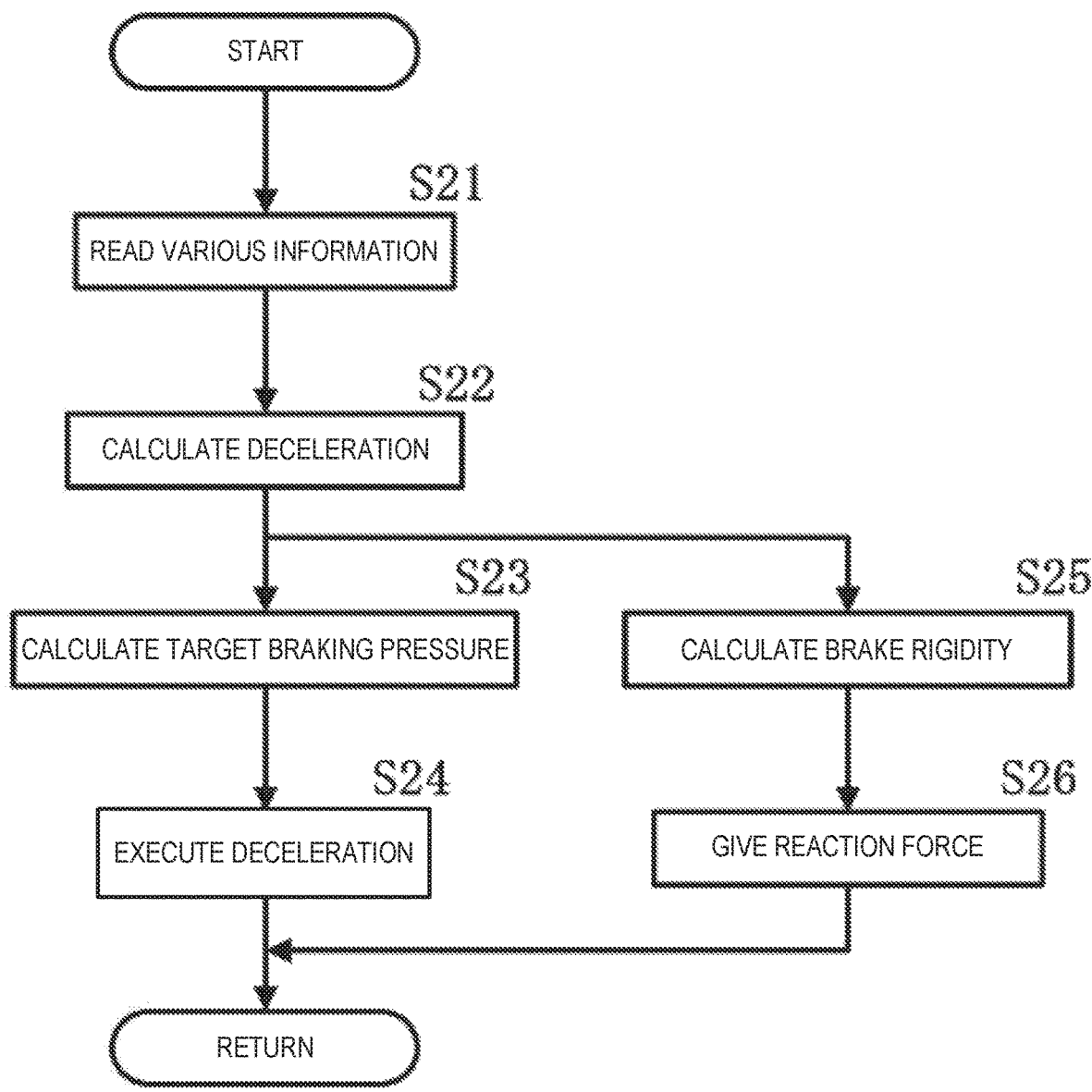
FIG. 10 is a flowchart illustrating a brake control.

Next, a brake control is described based on a flowchart of FIG. 10. Note that the brake control is performed in parallel with the steering control illustrated in FIG. 8 and the accelerator control illustrated in FIG. 9. First, at S21, the brake control module 24 reads a variety of information, such as the stepping stroke of the brake pedal 5, the deceleration characteristic map, and the brake rigidity characteristic map M3, and then shifts to S22. At S22, the brake control module 24 calculates the deceleration based on the deceleration characteristic map, etc., and then shifts to S23 and S25.

At S23, the brake control module 24 calculates a target braking pressure based on the deceleration, and then shifts to S24. At S24, the brake control module 24 controls the pump drive motor 16 so that the output of the brake device 9 reaches the target braking pressure, and then returns to S21. After S22, the brake control module 24 calculates, synchronizedly with S23, a target brake rigidity based on the deceleration and the brake rigidity characteristic map M3 (S25), and then shifts to S26. At S26, the brake control module 24 controls the motor 53 so that the brake pedal 5 has the brake rigidity according to the deceleration, then returns to S21.

Next, operation and effects of the control system 1 of this embodiment are described. Since the control system 1 has the steering sensor 31 which detects the operating amount of the steering wheel 3 by the operator, the speed sensor 12 which detects the traveling speed of the vehicle, and the steering control module 22 which calculates the lateral acceleration of the vehicle based on the detected operating amount and traveling speed, the lateral acceleration which is the vehicle behavior resulting from the operating amount of the steering wheel 3 by the operator can be calculated. Moreover, since the control system 1 has the reaction-force control module 25 which can control the reaction force given to the operator through the steering wheel 3, a suitable operating sensation of the steering wheel 3 can be sensed by the operator. Further, since the reaction-force control module 25 controls the reaction force so that the rigidity value which is the ratio of the reaction force of the steering wheel 3 to the operating amount increases as the calculated lateral acceleration increases, the operating sensation of the steering wheel 3 can be directly associated with the lateral acceleration of the vehicle, thereby matching the physical sensation (load tendency) of the operator through the steering wheel 3 with the actual vehicle behavior (acceleration tendency of operation). Therefore, the steering control of the vehicle with the operator's intuitive operating sensation is possible.

The reaction-force control module 25 is provided with the rigidity characteristic map M1 which defines the rigidity characteristic comprised of the lateral acceleration and the rigidity value. The rigidity characteristic is defined so that the first changing point $P1s$ is provided at the position near the lateral acceleration which can be sensed by the operator. The rigidity increasing rate $Ks1$ when the lateral acceleration is greater than the first changing point $P1s$ is greater than the rigidity increasing rate $Ks0$ when the lateral acceleration is less than the first changing point $P1s$. Therefore, the operator's operating sensation can be divided into the non-accelerating range and the first acceleration range. Moreover, the operator can intuitively recognize the reference point when turning the steering wheel 3 back to the neutral position.

The rigidity characteristic is also defined so that the second changing point $P2s$ is provided of which the lateral acceleration is greater than the first changing point $P1s$, and the rigidity increasing rate $Ks2$ when the lateral acceleration is greater than that of the second changing point $P2s$ is less than the rigidity increasing rate $Ks1$ when the lateral acceleration is less than that of the second changing point $P2s$. Therefore, the operability in the second acceleration range is secured, while the operator's operating sensation is divided into the first acceleration range, and the second acceleration range of which the acceleration is greater than the first acceleration range.

Since the reaction-force control module 25 controls the electric motor 33 which generates the reaction force according to the steering angle corresponding to the operating amount of the steering wheel 3, the physical sensation of the operator through the steering wheel 3 can be matched with the actual vehicle behavior, with a simple configuration.

Next, several modifications where the previous embodiment is partially changed will be described.

(Modification 1)

Although in the embodiment the example where each of the rigidity increasing rate in the non-accelerating range of the rigidity characteristic map M1, the first acceleration range, and the second acceleration range is set as the constant (e.g., they are linear) is described, the rigidity increasing rate may be a variable (e.g., a curve), which at least satisfies the relation of the formula (1).

(Modification 2)

Although in the embodiment the example where the front wheels are steered is described, the present disclosure is also applicable to a vehicle in which the rear wheels are steered. Moreover, although the example where the applicable condition of the rigidity characteristic map M1 is the range of 60 degrees to the left and 60 degrees to the right from the neutral position of the steering wheel 3, while the operator does not switch his/her hand on the steering wheel 3 is described, the applicable condition may suitably be changed according to the specification of the vehicle. Note that for ranges other than the applicable condition, the rigidity characteristic map may be prepared separately, and the maps may be selectively used, or the rigidity control may be suspended.

(Modification 3)

Although in the embodiment the example where the present disclosure is applied to the operation mechanisms of the steering wheel 3 and the accelerator pedal 4 is described, the present disclosure may be applied only to the steering wheel 3. Moreover, the present disclosure is also applicable to a shift lever, etc. in addition to the operation mechanism.

Those skilled in the art may implement the present disclosure in other forms in which the above embodiment is changed variously, without departing from the subject matter of the present disclosure. The present disclosure also includes such changes. It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Control system
2 ECU (Controller)
3 Steering Wheel
12 Vehicle Speed Sensor
22 Steering Control Module
31 Steering Sensor
33 Motor

What is claimed is:

1. A control system for a vehicle, comprising:
   a steering angle detector configured to detect a steering angle of a steering wheel by an operator, the steering wheel mounted on the vehicle;
   a speed detector configured to detect a traveling speed of the vehicle;
   a reaction-force generator configured to generate a reaction force of the steering wheel;
   a controller electrically connected with the steering angle detector, the speed detector, and the reaction-force generator, the controller including a processor configured to execute:
      a lateral acceleration calculating module to calculate a lateral acceleration based on the traveling speed and the steering angle;
      a rigidity characteristic setting module to set a reaction-force value so that a rigidity value that is a ratio of the reaction-force value to the steering angle increases as the lateral acceleration calculated by the lateral acceleration calculating module increases; and
      a reaction-force control module to control the reaction-force generator so that the reaction force generated by the reaction-force generator becomes the reaction-force value set by the rigidity characteristic setting module; and
   memory configured to store a rigidity characteristic map defining the rigidity value as a function of the lateral acceleration, the rigidity characteristic map comprising a first linear section and a second linear section connecting to the first linear section at a first changing point defining a first lateral acceleration threshold, a positive slope of the second linear section being greater than a positive slope of the first linear section such that a second rigidity increasing rate defined by the second linear section for lateral accelerations greater than the first lateral acceleration threshold is greater than a first rigidity increasing rate defined by the first linear section for lateral accelerations less than the first lateral acceleration threshold, wherein
   there is an instantaneous change from the first rigidity increasing rate to the second rigidity increasing rate at the first changing point.

2. The control system of claim 1, wherein the rigidity characteristic map further comprises a third linear section connecting to the second linear section at a second changing point defining a second lateral acceleration threshold greater than the first lateral acceleration threshold, a positive slope of the third linear section being less than the positive slope of the second linear section such that a third rigidity increasing rate defined by the third linear section for lateral accelerations greater than the second lateral acceleration threshold is less than the second rigidity increasing rate defined by the second linear section for lateral accelerations less than the second lateral acceleration threshold.

3. The control system of claim 1, wherein the reaction-force generator includes an electric motor configured to generate the reaction force according to the steering angle of the steering wheel.

4. The control system of claim 2, wherein the reaction-force generator includes an electric motor configured to generate the reaction force according to the steering angle of the steering wheel.

* * * * *